Sept. 22, 1964   W. K. LOWRY   3,149,417
CITRUS FRUIT PEELING TOOL
Filed Nov. 29, 1962
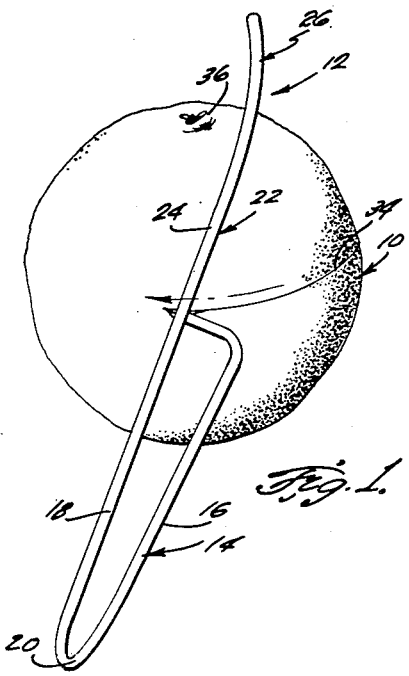
Fig. 1.
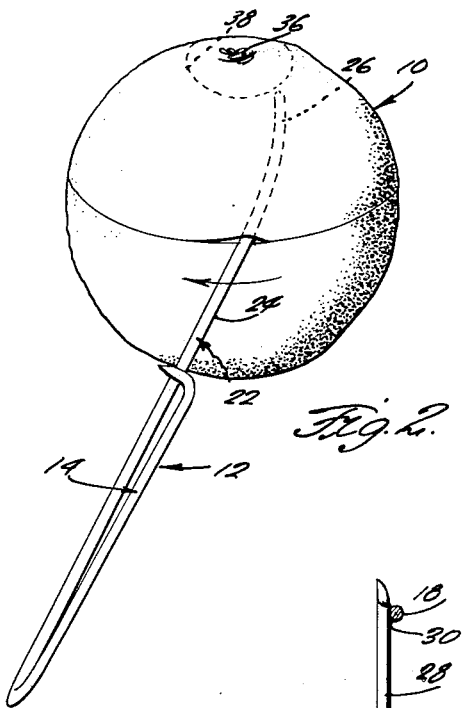
Fig. 2.
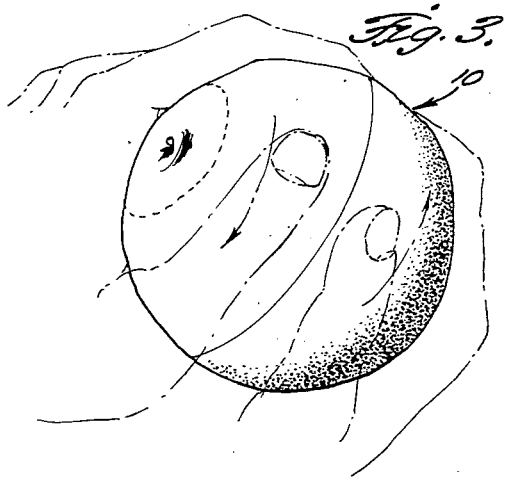
Fig. 3.
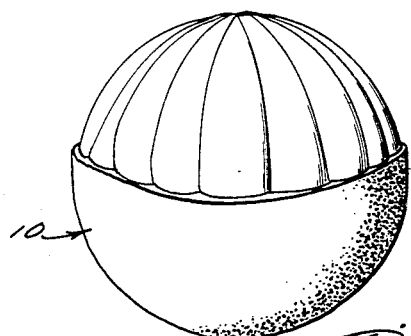
Fig. 4.
Fig. 6.
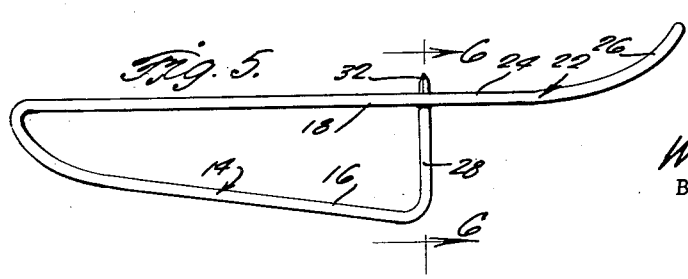
Fig. 5.
INVENTOR.
WILLIAM K. LOWRY
BY
Victor J. Evans & Co.
Attorneys 3,149,417
CITRUS FRUIT PEELING TOOL
William K. Lowry, 5066 Hall Road, Santa Rosa, Calif.
Filed Nov. 29, 1962, Ser. No. 240,864
1 Claim. (Cl. 30—24)

The present invention relates to kitchen utensils generally and in particular to a tool for peeling citrus fruit.

The primary object of the present invention is to provide a tool by means of which oranges, grapefruit, or the like, may have their skins removed with ease and facility, and without the spilling or wasting of the fruit.

Another object of the present invention is to provide a citrus fruit peeling tool which enables the user thereof to loosen the skin of a citrus fruit so that the fruit may be taken in lunches or the like, and the skin retained on the fruit until the fruit is ready for consumption.

A further object of the present invention is to provide a citrus fruit peeling tool which is easy and simple to use, one which is manufactured of such material as to readily be cleaned and sterilized after use, and one which may be manufactured in quantity at reasonable cost.

These and other objects and advantages of the invention will be shown and understood from the following description when taken in conjunction with the annexed drawing, in which:

FIGURE 1 is a view of a citrus fruit showing the tool of the present invention employed to cut the skin of the fruit along a mid-section line, FIGURE 2 shows the tool in use to loosen the skin on one section of the fruit, FIGURE 3 shows the fruit having its two loosened sections rotated by the hands of the user, FIGURE 4 is an elevational view of a citrus fruit with one half of the skin removed with the tool of the present invention, FIGURE 5 is a plan view of the tool, and FIGURE 6 is a view taken on the line 6—6 of FIGURE 5.

Referring to the drawing in detail, in FIGURES 1 to 4, the reference numeral 10 designates a citrus fruit such as an orange or a grapefruit. The tool of the present invention is designated generally by the reference numeral 12 and it comprises a rigid rod element bent upon itself to form an elongated U-shaped handle 14. The handle 14 has legs 16 and 18 connected together by a closed bight 20.

An extension 22 projects from the free end of the leg 18 and has a straight portion 24 adjacent the leg 18 and a curved portion 26 remote from the leg 18.

A curved portion 26 faces away from the leg 16 of the handle 14. A portion of the rigid rod element serves as a bar 28 formed integrally with the free end of the leg 16 and extending between the leg 16 and the leg 18 with the junction of the bar 28 and the leg 18 welded together as at 30 in FIGURE 6.

A portion of the bar 28 adjacent the leg 18 projects beyond the leg 18 and is sharpened to a point 32.

In use, as in FIGURE 1, the point 32 is first employed to sever the skin of the fruit 10 along a mid-line 34 an equal distance between the stem end 36 and the blossom end of the fruit, the latter not being shown.

The next step is to insert the curved portion 26 of the extension 22 beneath the skin of the fruit 10, as in FIGURE 2 and by rotating the fruit 10 with the portion 26 under the skin, the skin is gradually loosened to an area surrounding but not including the stem end 36, as indicated by the dotted line 38 in FIGURE 2.

The process is repeated to loosen the other hemispheric portion of the skin of the fruit 10 so that upon grasping of the fruit 10 by both hands, as in FIGURE 3, the hemispheric skin sections may be twisted loose from the fruit either totally or to remove just one of the skin sections as in FIGURE 4 as desired.

It will be seen therefore that fruit can be prepared for luncheons and that the skin be retained on the fruit until the luncheon is to be consumed thus preserving the natural fruit juices against dehydration and possible loss from the fruit.

The tool of the present invention also enables the user thereof to completely remove the skin from a citrus fruit so that the sections may be peeled and removed from skin.

An important feature of the present invention resides in the employment of a material which is rigid for the rod element which forms the tool of the present invention but the material should be bendable either with the use of heat or bent cold as long as the tool has sufficient rigidity to employ the same as heretofore described.

While only a preferred embodiment of the present invention has been shown and described, other embodiments are possible and numerous changes and modifications may be made in the invention without departing from the spirit thereof as set forth in the appended claim.

What is claimed is:

A citrus fruit peeling tool comprising a rigid rod element bent upon itself to form an elongated U-shaped handle, a bar disposed so as to extend between the legs of said handle and having one end thereof formed integrally with the free end of one leg of said handle, the portion of said bar adjacent the other leg of said handle projecting beyond said other leg and being sharpened to a point, the junction of said bar portion and said other leg being welded, the part of said other leg adjacent said bar bearing against the surface of a citrus fruit to be peeled when said pointed bar portion is inserted into the rind of said fruit for severing said rind, said other leg serving as a depth gauge to prevent penetration of said bar beyond the rind of said fruit.

References Cited in the file of this patent
UNITED STATES PATENTS

| | | |
|---|---|---|
| 2,522,054 | Novak | Sept. 12, 1950 |
| 2,858,605 | Engstrom | Nov. 4, 1958 |
| 2,974,411 | Little | Mar. 14, 1961 |